United States Patent Office 2,839,491
Patented June 17, 1958

2,839,491

ACRYLAMIDE-OLEFIN ALCOHOL COPOLYMERS

John R. Caldwell and Russell Gilkey, Kingsport, Tenn., assignors to Eastman Kodak Company, Rochester, N. Y., a corporation of New Jersey No Drawing. Application March 23, 1953
Serial No. 344,220

4 Claims. (Cl. 260—45.5)

The present invention relates to novel acrylonitrile polymer compositions and a method for the preparation of the same. In particular, the invention is concerned with a resinous product suitable for spinning into synthetic fibers and prepared by the polymerization of acrylonitrile in the presence of a derived polymer of an acrylamide with an olefinic alcohol.

The suitability of polyacrylonitrile for the formation of fibers has in the past been improved upon in various ways by the incorporation of various types of modifying material. In accordance with a recent advance as taught by Coover and Dickey in U. S. Patent No. 2,620,324, issued December 2, 1952, a polymer of acrylonitrile of improved dye affinity may be prepared by polymerizing acrylonitrile in the presence of a homo or copolymer of an acrylamide, inclusive of copolymers of an acrylamide with an ethylenically unsaturated compound. In accordance with the teaching of Hagemeyer, Oglesby, and Caldwell, U. S. Patent No. 2,569,470, issued October 2, 1951, improved polyacrylonitrile for fiber forming purposes is prepared by the formation of place polymers of acrylonitrile with derived homo polymers. A place polymer of this type is believed to be somewhat differentiated in composition from the so called "graft" polymers in that a place polymer exhibits no grafting or cross-linking through polymeric action presumably due to the fact that the copolymer always has its valences substantially satisfied. However, the place polymers of the present invention do appear to exhibit a chemical union between the two components, i. e. between the polyacrylonitrile and the modifying derived polymer which is employed.

We have discovered a novel place polymer composition which gives fiber-forming solutions of special utility. Our novel compositions provide an improvement over the compositions taught in the above mentioned Coover and Dickey Patent No. 2,620,324. We have found that our novel compositions, unlike the specific compositions of the patent, which contain no free hydroxyl groups, will provide excellent dye affinity for the same and additional dyes at a lower range of concentrations of modifier, e. g. 12–15%, than is suggested in the patent. Our novel fiber-forming compositions are observed to have a good affinity for dyestuffs of various types, a softening point above 220° C., no brittleness at temperatures of use, and no segmentation of the type described in the aforementioned patents.

In accordance with our discovery, a primary object of the invention is to provide new polyacrylonitrile compositions modified for the purpose of providing improved characteristics for and suitable for use in the preparation of fibers. Another object of the invention is to provide a method for the preparation of novel modified polyacrylonitrile compositions. Other objects will be obvious from a consideration of the accompanying specification and claims.

Within the present specification and claims certain terms will be employed to define as precisely as possible the distinctive nature of the novel compositions of the invention. The term "copolymer" as employed herein is meant to define a high polymer resulting from the conjoint polymerization of two chemically different monomeric substances, the molecules of the product containing large numbers of units of the two chemically different types in irregular sequence. A "derived polymer" is a polymeric substance, e. g. a high polymer consisting of molecules containing large numbers of units of two or more chemically different types in irregular sequence which is obtained by chemical reaction on a copolymer formed from two monomeric polymerizable materials, which reaction results in a change in the identity of certain characteristic groups of the original copolymer. In other words, a "derived polymer" is one which ordinarily is not or cannot be obtained by direct polymerization of two monomeric materials, but which results from modification of certain groups of a copolymer which has been so obtained. The compositions of the present invention are identified as "modified acrylonitrile polymers," by which term is meant polymeric substances formed primarily of acrylonitrile but containing amounts of a modifying additive sufficient, under the conditions of addition, to change the characteristics of polyacrylonitrile as respects certain of its important chemical and physical properties, e. g. dye affinity, softening point, brittleness, and segmentation of fibers formed therefrom. The additives employed in accordance with the present invention to "modify" polyacrylonitrile exert an effect on the latter in accordance with the particular time of addition to the acrylonitrile of the additive.

In accordance with the invention, modifying substances are added to acrylonitrile during its "inductive" period, or at least at some time before substantial polymerization has taken place. That is to say, the additives are present during all or substantially all of the conversion of the monomeric acrylonitrile to its polymeric form. Addition of additives at such time relative to the degree of polymerization of the acrylonitrile will be referred to herein as the "inceptive incorporation" of such additive and the additives will be referred to as "inceptive modifiers." The products produced in accordance with the "inceptive modification" of polyacrylonitrile are products in the nature of "place polymers." Place polymers of acrylonitrile made in accordance with the invention are more than mere intimate mixtures of the inceptive modifier and polyacrylonitrile. The exact nature of the compositions is not known but there appears to be an inner equilibrium of some sort set up within the compositions between the modifier and the polymerized acrylonitrile, since the polymer compositions assume the character of a unary system or a one component system. These compositions are somewhat in the nature of solid solutions since they are not affected by solvent extraction techniques and cannot be mechanically broken down into their component parts. It is believed that the compositions of the invention exhibit, in addition to polymerization of the acrylonitrile, some cyanoethylation of the inceptive modifier, some imino-ether formation by the nitrile groups of the polyacrylonitrile and hydroxyl groups of the inceptive modifier in accordance with the invention.

According to the present invention, novel compositions are prepared which comprise polymeric acrylonitrile modified by the inceptive incorporation therein of a derived polymer of an acrylamide and an olefinic alcohol selected from the group consisting of vinyl alcohol, allyl alcohol, and methallyl alcohol. The invention further contemplates a method for the preparation of resinous fiberforming compositions softening above 220° C. and having good dye affinity, the method comprising the step of polymerizing monomeric acrylonitrile in the presence of an acrylamide-alcohol polymer, e. g. a polymer resulting from the ammonolysis of a copolymer formed by the conjoint polymerization of a monomeric acrylate and a monomeric olefinic acetate. The invention also contemplates a process comprising the steps of converting an acrylate-acetate copolymer to an acrylamide-alcohol polymer by means of ammonolysis and polymerizing acrylonitrile in the presence of the product of the ammonolysis.

The acrylamide-vinyl, -allyl, or -methallyl alcohol derived polymers advantageously are prepared from (emulsion) copolymers of methyl acrylate and the appropriate acetate, e. g. an alkenyl acetate as defined above. These copolymers most advantageously should contain 30–80% of methyl acrylate. Preferably 40–60% methyl acrylate is employed with vinyl acetate and 50–70% with allyl or methallyl acetate. The copolymer is heated in either case with 2–5 parts of methyl, ethyl, or isopropyl alcohol containing 0.5 to 2 parts of an amine or ammonia ammonolysis reagent. The ammonolysis reaction preferably is carried out in a pressure vessel equipped with agitating means at 80–120° C. for 2–4 hours, and up to 5 hours for the allylic copolymers.

The polymer of acrylamide with the alkenyl alcohol derived by the ammonolysis procedure is isolated by evaporation of the solvent or by pouring the solution into a precipitant such as benzene or isopropyl ether. Suitable ammonolysis reagents include various amines such as monomethyl, monoethyl, isopropyl, and monobutyl. Cyclic amines such as morpholine, piperidine, and pyrrolidine may also be employed. The lower aliphatic amines are quite advantageous since with them a high conversion to the corresponding acrylamide may be obtained. The conversion ordinarily is in the range of 50–90% in accordance with the practice of the invention, and the products in most cases are soluble in water. With the allylic acetates, conversion to the amide may in some cases reach substantially 100%.

The acrylamide-vinyl (or -allyl or -methallyl) alcohol polymers may also be made by hydrolyzing the acetyl groups from acrylamide-alkenyl acetate interpolymers. For example, an interpolymer containing 75% N-isopropyl acrylamide-25% vinyl acetate may be selectively hydrolyzed by known methods, using dilute sulfuric acid, to remove the acetyl groups but leaving the N-isopropyl amide groups unchanged. The hydrolysis may be carried out in alcohol, water, or other suitable medium. Ammonium hydroxide or amines at 25–100° C. are especially suitable for the selective hydrolysis. Sodium carbonate or sodium hydroxide may be used. Interpolymers of vinyl acetate with the following amides may be used: acrylamide, methacrylamide, N-methyl acrylamide, N-ethyl acrylamide, N-methyl methacrylamide, N,N-dimethyl acrylamide, N-isopropyl acrylamide, and N-phenyl acrylamide. The interpolymers may contain from 20 to 70% vinyl acetate, and preferably 40 to 60% vinyl acetate before hydrolysis.

After the derived polymer has been isolated and the excess amine removed, it is dissolved in water (or other suitable solvent if it is water-insoluble) and acrylonitrile monomer is added to the solution. One or more polymerization catalysts such as persulfates, peroxides, etc. are added, and the acrylonitrile is polymerized to produce a composition having the characteristics of a place polymer as described above. The invention contemplates compositions prepared from 3–7 (and in some instances 8) parts of acrylonitrile by weight per one part of the derived polymer. The preferred range where the modifying polymer is vinylic is 4–6 parts of acrylonitrile per part of derived polymer, while the preferred range is 4–7 parts of acrylonitrile when allylic derived polymers are used as the modifying agent. The place polymers of polyacrylonitrile and the inceptively incorporated derived polymer of acrylamide and alkenyl alcohol which results from the method of the invention may be isolated by spray drying or by precipitation in a nonsolvent such as acetone. The compositions are soluble in dimethyl acetamide, dimethylformamide, γ-butyrolactone, and ethylene cyanohydrin.

For fiber formation, the usual wet spinning methods may be employed wherein a solution of a polymer in a suitable solvent is extruded through a multi-hole spinneret into a precipitating bath. Alternatively, fibers can be prepared by dry spinning methods wherein the solution of polymer is extruded into an evaporative atmosphere. Fibers formed from a novel composition of the invention can be dyed readily with acid wool dyes, cellulose acetate dye, direct cotton dyes and vat dyes. The invention is illustrated in the following examples:

Example 1

An emulsion copolymer having the composition 60 parts methyl acrylate to 40 parts methallyl acetate by weight was prepared by the usual methods. One hundred grams of the copolymer, 400 cc. methyl alcohol, and 40 g. monomethyl amine were heated in a stirring autoclave at 100° C. for 4 hours. The alcohol and excess amine were evaporated under vacuum at 80–90° C. The residue contained N-methyl acetamide formed in the hydrolysis of the methallyl acetate portion of the copolymer. However, it was not necessary to remove the N-methyl acetamide since it was found not to interfere with the polymerization of acrylonitrile. The resulting N-methyl acrylamide-methallyl alcohol polymer dissolved in water to give a light yellow solution. By means of a nitrogen analysis, the methyl acrylate groups were shown to be 100 percent converted to N-methyl acrylamide groups. The methallyl acetate groups were completely hydrolyzed to methallyl alcohol groups.

Thirty grams of the thus derived N-methyl acrylamide-methallyl alcohol polymer was dissolved in 1500 cc. water and the following materials were added:

| | | |
|---|---|---|
| Acrylonitrile | g | 170.0 |
| Potassium persulfate | g | 2.5 |
| Sodium bisulfite | g | 1.5 |
| t-Dodecyl mercaptan | g | 0.2 |
| Phosphoric acid | cc | 1.0 |

The mixture was stirred at 50–60° C. for 8 hours to give an emulsion. The emulsion was poured into 8–10 l. of acetone and the resulting granular precipitate was filtered and dried at 50° C. A yield of 185 g. was obtained.

The product was dissolved in dimethylformamide and gave a smooth, clear solution that showed no tendency to separate on standing. Fibers spun from the solution were observed to dye well with each of the classes of dyes mentioned above.

Example 2

An emulsion copolymer having the composition 50 parts methyl acrylate to 50 parts methallyl acetate by weight was prepared by the usual methods. One hundred grams of the copolymer, 400 cc. methyl alcohol, and 60 g. monoethyl amine were heated in a stirring autoclave at 100° C. for 5 hours. The alcohol and excess amine were evaporated at 80–90° C. under reduced pressure. The resulting N-ethyl acrylamide-methallyl alcohol polymer was shown by means of a nitrogen analysis to be 80 percent converted to the N-ethyl acrylamide.

Forty grams of the product was dissolved in 1500 cc. water and the following materials were added:

| | | |
|---|---|---|
| Acrylonitrile | g | 160.0 |
| Potassium persulfate | g | 2.4 |
| Sodium bisulfite | g | 1.4 |
| t-Dodecyl mercaptan | g | 0.2 |
| Phosphoric acid | cc | 2.0 |

The phosphoric acid was added slowly with vigorous agitation, after addition of the other compounds, since the acrylamide-methallyl alcohol polymer precipitated out upon addition of acid. It redispersed when the acrylonitrile started to polymerize. The mixture was stirred at 50–55° C. for 8 hours to give a thick slurry. The product was filtered, washed with water, and dried at 50° C. A yield of 185 g. was obtained. Fibers spun from the product were found to dye well with each of the classes of dyes mentioned above.

*Example 3*

A bead copolymer was prepared having the composition 60 parts methyl acrylate to 40 parts allyl acetate by weight. One hundred grams of the copolymer, 400 cc. isopropyl alcohol, and 80 g. isopropyl amine were heated at 120° C. for 5 hours in a stirring autoclave. The alcohol and excess amine were evaporated at reduced pressure. Analysis showed that the methyl acrylate portion had been 50 percent converted to the N-isopropyl acrylamide.

Fifty grams of the product thus obtained was dissolved in 1500 cc. water and the following materials were added:

| | |
|---|---|
| Acrylonitrile _____ g__ | 150.0 |
| Ammonium persulfate_____ g__ | 2.3 |
| Sodium bisulfite_____ g__ | 1.7 |
| t-Dodecyl mercaptan_____ g__ | 0.2 |
| Phosphoric acid_____ cc__ | 2.0 |

The addition of phosphoric acid caused the acrylamide-allyl alcohol polymer to precipitate but it redispersed during the polymerization. The mixture was stirred at 50–55° C. for 8 hours to give a thick slurry. The product was filtered and washed with water. A yield of 180 g. was obtained. Fibers spun from the product dyed well with the classes of dyes listed above.

*Example 4*

An emulsion copolymer was prepared having the composition 75 parts methyl acrylate to 25 parts allyl acetate by weight. One hundred grams of the copolymer, 400 cc. methyl alcohol, and 42 g. monomethyl amine were heated at 100° C. for 4 hours in a stirred autoclave. The alcohol and excess amine were evaporated at reduced pressure. Analysis showed that the methyl acrylate portion was 95 percent converted to N-methyl acrylamide. The allyl acetate portion was completely hydrolyzed to allyl alcohol groups.

A twenty-five gram portion of the product was dissolved in 1500 cc. water and the following materials were added:

| | |
|---|---|
| Isopropenyl acetate_____ g__ | 25.0 |
| Acrylonitrile _____ g__ | 150.0 |
| Ammonium persulfate_____ g__ | 2.5 |
| Sodium bisulfite_____ g__ | 1.5 |
| Phosphoric acid_____ cc__ | 2.0 |

The mixture was stirred at 50–55° C. for 7 hours to give an emulsion. The product was isolated by precipitating in acetone. A yield of 180–190 g. was obtained and the product consisted of approximately 87.5 parts acrylonitrile-isopropenyl acetate interpolymer and 12.5 parts N-methyl acrylamide-allyl alcohol polymer in intimate "mixture," i. e. place polymer relationship. Fibers spun from the mixture dyed well with the classes of dyes described above.

*Example 5*

An emulsion copolymer having the composition 50 parts methyl acrylate to 50 parts vinyl acetate by weight was prepared by the usual methods. One hundred grams of the copolymer, 400 cc. methyl alcohol, and 45 g. monomethyl amine were heated in a stirring autoclave at 100° C. for 4 hours. The alcohol and excess amine were evaporated in vacuum at 80–90° C. The residue contained N-methyl acetamide formed in the hydrolysis of the vinyl acetate portion of the copolymer. It was not necessary to remove the N-methyl acetamide since it was found not to interfere with the polymerization of acrylonitrile. The thus prepared N-methyl acrylamide-vinyl alcohol polymer dissolved in water to give a light yellow solution. It contained 9.2 percent nitrogen by analysis. This corresponds to about 85 percent conversion of the methyl acrylate groups to N-methyl acrylamide groups. The vinyl acetate groups were completely hydrolyzed to vinyl alcohol groups.

Thirty grams of the N-methyl acrylamide-vinyl alcohol polymer was dissolved in 1500 cc. water and the following materials were added:

| | |
|---|---|
| Acrylonitrile _____ g__ | 170.0 |
| Potassium persulfate_____ g__ | 2.6 |
| Sodium bisulfite_____ g__ | 1.8 |
| t-Dodecyl mercaptan_____ g__ | 0.3 |
| Phosphoric acid_____ cc__ | 2.0 |

The mixture was stirred at 50–60° C. for 8 hours to give a thin emulsion. The emulsion was poured into 8–10 l. of acetone and the resulting granular precipitate was filtered and dried at 50° C. The yield was quantitative.

The product was dissolved in dimethylformamide and produced a smooth, clear solution that showed no tendency to separate on standing. Fibers spun from the solution were observed to dye well with the classes of dyes listed above.

*Example 6*

An emulsion copolymer having the composition 60 parts methyl acrylate to 40 parts vinyl acetate by weight was prepared by the usual methods. One hundred grams of the copolymer, 400 cc. methyl alcohol, and 65 g. monoethyl amine were heated in a stirring autoclave at 100° C. for 4 hours. The alcohol and excess were evaporated at 80–90° C. under reduced pressure. The resulting N-ethyl acrylamide-vinyl alcohol polymer was found, by nitrogen analysis, to be 60 percent converted to the N-ethyl acrylamide.

Forty grams of the product was dissolved in 1500 cc. water and the following materials added:

| | |
|---|---|
| Acrylonitrile _____ g__ | 160.0 |
| Potassium persulfate _____ g__ | 2.4 |
| Sodium bisulfite _____ g__ | 1.6 |
| t-Dodecyl mercaptan _____ g__ | 0.3 |
| Phosphoric acid _____ cc__ | 2.0 |

The mixture was stirred at 50–55° C. for 8 hours to give a thin slurry. The product was then isolated by precipitating in acetone, and a yield of 180–190 g. was obtained. Fibers spun from the product dyed well with the classes of dyes listed above.

*Example 7*

An emulsion copolymer was prepared having the composition 75 parts methyl acrylate to 25 parts vinyl acetate by weight. One hundred grams of the copolymer, 400 cc. isopropyl alcohol, and 82 g. isopropyl amine were heated at 120° C. for 4 hours in a stirred autoclave. The alcohol and excess amine were evaporated at reduced pressure. Analysis showed that the methyl acrylate portion was 50 percent converted to the N-isopropyl acrylamide.

Fifty grams of the product were dissolved in 1500 cc. water and the following materials added:

| | |
|---|---|
| Acrylonitrile _____ g__ | 150.0 |
| Ammonium persulfate_____ g__ | 2.3 |
| Sodium bisulfite _____ g__ | 1.7 |
| t-Dodecyl mercaptan _____ g__ | 0.3 |
| Phosphoric acid _____ cc__ | 3.0 |

The mixture was stirred at 50–55° C. for 8 hours to give a thick slurry. Subsequently, the product was filtered and washed with water. A yield of 180–190 g. was obtained. Fibers spun from the product dyed well with the classes of dyes listed above.

*Example 8*

An emulsion copolymer was prepared having the composition 40 parts methyl acrylate to 60 parts vinyl acetate by weight. One hundred g. of the copolymer, 400 cc. methyl alcohol, and 45 g. monomethyl amine were heated at 100° C. for 3 hours in a stirred autoclave. The alcohol and excess amine were evaporated at reduced pressure. Analysis showed that the methyl acrylate portion was 90 percent converted to the N-methyl acrylamide. The vinyl acetate portion was completely hydrolyzed to vinyl alcohol groups.

Twenty-five grams of the product was dissolved in 1500 cc. water and the following materials added:

| | | |
|---|---|---|
| Isopropenyl acetate | g | 25 |
| Acrylonitrile | g | 150 |
| Ammonium persulfate | g | 2.5 |
| Sodium bisulfite | g | 1.5 |
| Phosphoric acid | cc | 3.0 |

The mixture was stirred at 50–55° C. for 7 hours to give a thick slurry, and the product was isolated by precipitating in acetone. A yield of 180–190 g. was obtained and the product consisted of a place polymer having the composition approximately 87.5 parts acrylonitrile-isopropenyl acetate interpolymer and 12.5 parts N-methyl acrylamide-vinyl alcohol polymer. Fibers spun from the mixture dyed well with the classes of dyes described above.

We claim:

1. A graft copolymer of from 75 to 90% by weight of acrylonitrile and from 25 to 10% by weight of a preformed terpolymer of a mixture of monomers consisting of methyl acrylate, vinyl alcohol and an N-alkyl acrylamide wherein the alkyl group contains from 1 to 4 carbon atoms, the said terpolymer having been obtained by heating in the proportions of 1 part by weight of a binary copolymer consisting of from 30 to 80% by weight of methyl acrylate and from 70 to 20% by weight of vinyl acetate with from 0.5 to 2 parts by weight of a primary monoalkylamine containing from 1 to 4 carbon atoms, in a reaction medium consisting of a saturated monohydric aliphatic alcohol containing from 1 to 3 carbon atoms, until from 50 to 90% by weight of the said methyl acrylate units had been converted to the corresponding N-alkyl acrylamide units and substantially 100% by weight of the said vinyl acetate units had been converted to vinyl alcohol units.

2. A graft copolymer of from 75 to 90% by weight of acrylonitrile and from 25 to 10% by weight of a preformed terpolymer of a mixture of monomers consisting of methyl acrylate, vinyl alcohol and N-methyl acrylamide, the said terpolymer having been obtained by heating in the proportions of 1 part by weight of a binary copolymer consisting of from 30 to 80% by weight of methyl acrylate and 70 to 20% by weight of vinyl acetate with from 0.5 to 2 parts by weight of methylamine, in a reaction medium consisting of a saturated monohydric aliphatic alcohol containing from 1 to 3 carbon atoms, until from 50 to 90% by weight of the said methyl acrylate units had been converted to N-methyl acrylamide units and substantially 100% by weight of the said vinyl acetate units had been converted to vinyl alcohol units.

3. A graft copolymer of from 75 to 90% by weight of acrylonitrile and from 25 to 10% by weight of a preformed terpolymer of a mixture of monomers consisting of methyl acrylate, vinyl alcohol and N-ethyl acrylamide, the said terpolymer having been obtained by heating in the proportions of 1 part by weight of a binary copolymer consisting of from 30 to 80% by weight of methyl acrylate and 70 to 20% by weight of vinyl acetate with from 0.5 to 2 parts by weight of ethylamine, in a reaction medium consisting of a saturated monohydric aliphatic alcohol containing from 1 to 3 carbon atoms, until from 50 to 90% by weight of the said methyl acrylate units had been converted to N-ethyl acrylamide units and substantially 100% by weight of the said vinyl acetate units had been converted to vinyl alcohol units.

4. A graft copolymer of from 75 to 90% by weight of acrylonitrile and from 25 to 10% by weight of a preformed terpolymer of a mixture of monomers consisting of methyl acrylate, vinyl alcohol and N-isopropyl acrylamide, the said terpolymer having been obtained by heating in the proportions of 1 part by weight of a binary copolymer consisting of from 30 to 80% by weight of methyl acrylate and 70 to 20% by weight of vinyl acetate with from 0.5 to 2 parts by weight of isopropylamine, in a reaction medium consisting of a saturated monohydric aliphatic alcohol containing from 1 to 3 carbon atoms, until from 50 to 90% by weight of the said methyl acrylate units had been converted to N-isopropyl acrylamide units and substantially 100% by weight of the said vinyl acetate units had been converted to vinyl alcohol units.

References Cited in the file of this patent

UNITED STATES PATENTS

| | | |
|---|---|---|
| 2,569,470 | Hagemeyer et al. | Oct. 2, 1951 |
| 2,620,324 | Coover et al. | Dec. 2, 1952 |
| 2,649,434 | Coover et al. | Aug. 18, 1953 |
| 2,657,191 | Coover et al. | Oct. 27, 1953 |

FOREIGN PATENTS

| | | |
|---|---|---|
| 508,726 | Belgium | Jan. 25, 1952 |

OTHER REFERENCES

Degering: "An Outline of Organic Chemistry," 5th edition, pages 250–251, Barnes and Noble, New York, 1947.